Sept. 17, 1968
A. GLOWKA
3,401,967
FISHERMAN'S APPARATUS
Filed Jan. 27, 1966
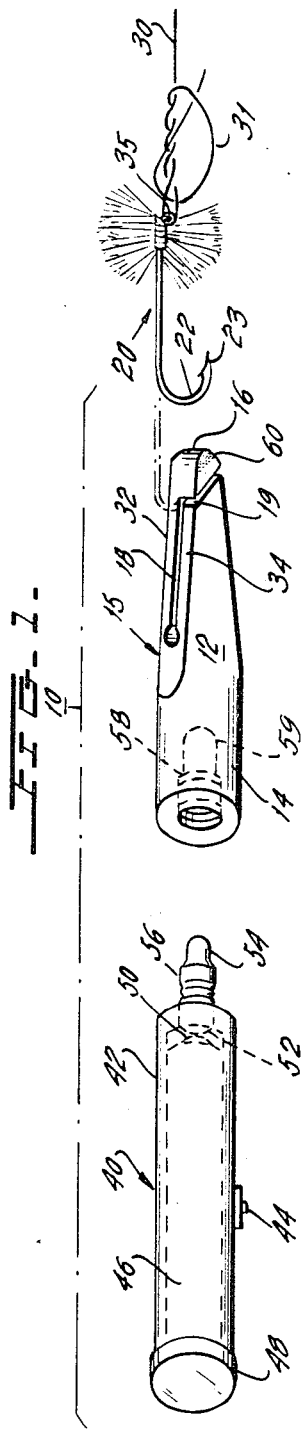
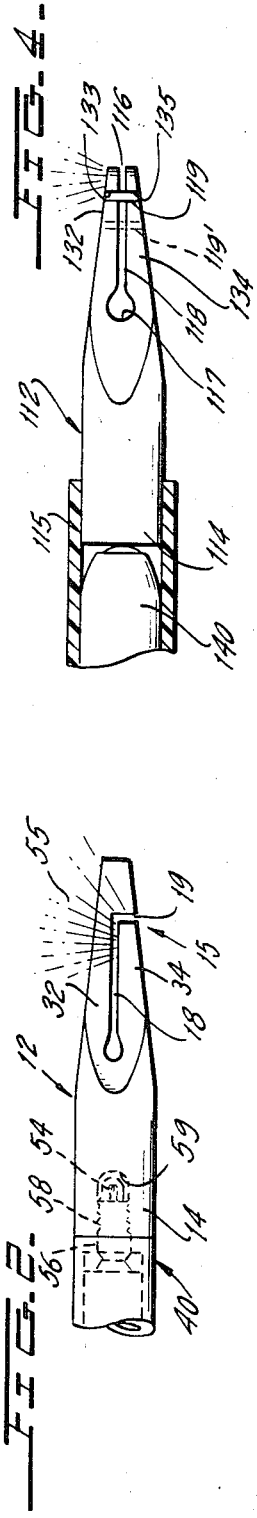
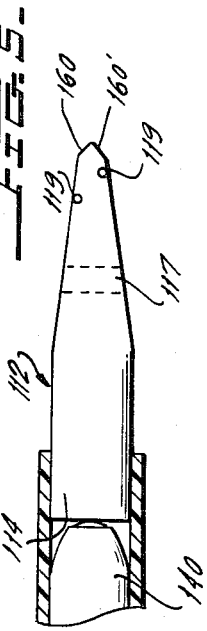
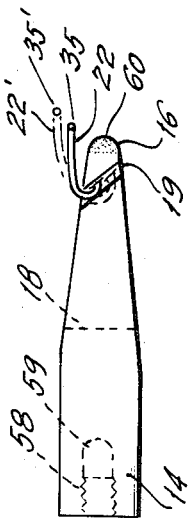
INVENTOR.
ARTHUR GLOWKA
BY
OSTROLENK, FABER, GERB & SOFFEN
ATTORNEYS

United States Patent Office 3,401,967
Patented Sept. 17, 1968

3,401,967
FISHERMAN'S APPARATUS
Arthur Glowka, 700 Scarsdale Ave.,
Scarsdale, N.Y. 10583
Filed Jan. 27, 1966, Ser. No. 523,433
10 Claims. (Cl. 289—17)

ABSTRACT OF THE DISCLOSURE

A fisherman's implement for facilitating the tying of the leader through the small eye of a fly, which includes a self-contained source of illumination for lighting the region receiving the hooked end of the fly and firmly grasping same while the eye is illuminated, so as to facilitate the tying of the leader in a secure manner.

My invention relates to a fisherman's apparatus for facilitating the threading of a leader strand through the small eye of a fly, and more particularly to such an apparatus which includes a self-contained source of illumination and is of improved simplicity of construction and ease of operation and handling.

The securement of a leader strand through the eye of a fly has always presented a problem to the fisherman, particularly when it becomes necessary to tie the line to a fly hook which is so dressed with feathers or the like that the resulting hackle interferes with easy projection of the leader through the hook eye. Also, the tying of the leader to the hook without damaging the hackle is in itself a relatively difficult and cumbersome operation, particularly in the case of small flies which are difficult to manually thread and tie. To partially alleviate this problem, the prior art has presented a substantial variety of knot tying apparatus and devices, of varying degrees of complexity, as typically exemplified by Parkhurst, U.S. Patent No. 2,107,645; Fulvio U.S. Patent No. 2,601,605; Masson, 2,734,299; Smith, 2,758,858; Smalley 2,773,713; Stillwell 2,783,571, and 2,804,710; Wimberley 2,926,036; Kennedy 2,934,369; Arnold 3,012,361; Dannebaum 3,043,615; Boutwell 3,073,636; Keeton 3,086,082; and Reaser 3,101,964. All these devices generally include some form of holder which receives the fly or fish hook and positions the eye thereof in a location to receive the line or leader.

It is known that fishing conditions for certain species are oftentimes desirable during the night, or periods of the day having only an extremely limited degree of natural illumination. Also, should the fisherman have slightly impaired vision, the threading of the leader may even be difficult in daylight without a back source of illumination. The solution to this problem has generally suggested the addition of a separate flashlight or similar source of illumination, which the user must either position on an adjacent fixture, or secure to his person; or, as shown in Stillwell U.S. Patent No. 2,804,710, an auxiliray flashlight mounted to a functionally independent portion of the knot threading device. As can well be imagined, these various prior art solutions to the problem of illuminating the knot tying device have been of extremely limited benefit, in aiding the night fisherman. It should be also recognized that fishing during dawn, dusk or the nighttime hours is oftentimes experienced in conjunction with adverse environmental conditions, limiting the dexterity of the user, and therefore requiring an extremely simplified apparatus to accomplish the desired threading and tying functions.

My invention aptly solves these problems by providing a knot tying fixture and self-contained source of illumination, that is of unitary organization, and of such size and shape that it may be held conveniently in the hand, or when not in use may be carried by the user in a pocket or his wearing apparel. More specifically, the device of the instant invention includes an elongated member which is constructed of a type of well known clear plastic material having the characteristic of longitudinally transmitting a concentrated beam of light between its opposed ends. Such light conducting plastic materials which are a polymerized derivative of acrylic resin, and more commonly known under the trademark names of "Lucite" or "Plexiglas" are strong, resistant to outdoor exposure, and have the above-noted characteristics of transmitting light impinging one end through its entire length to the opposite end.

The elongated member of my invention, constructed of such a light conducting material, includes a simplified support means at one end thereof which is adapted to removably receive and support the hooking portion of a fly inserted therein, and a light source means carried at its opposite end. The hook support means may take the form of a slit, which receives the hook-shaped portion of the fly, such that the eye of the fly is positioned at a predetermined region of the elongated member. The source of illumination may be a readily commercially available penlight at the opposed end of the elongated member and longitudinally abutting its end. The light rays emitted by the penlight will be transmitted through the elongated member to the hook receiving end, whereat they are suitably directed towards the predetermined region receiving the eye of the fly, so as to provide an illuminated work area including the slit region. The support means is of a suitable configuration such that various size hooks may be accommodated with their eyes thereof being located in the illuminated work area.

It is therefore seen that the instant invention provides a simplified fisherman's knot tying apparatus, having facility for illuminating the work area without resorting to cumbersome and bothersome arrangements of additional lighting assemblies.

It is therefore a primary object of my invention to provide a simplified knot tying device with a self-contained source of light.

A further object of my invention is to provide a simplified knot tying device constructed of material having the characteristic of longitudinally transmitting a concentrated beam of light between its opposed ends, and having a hook receiving support means at one end thereof, and carrying a source of light at the opposed end thereof.

Another object of my invention is to provide such a knot tying device, wherein the hook support means includes an opening of suitable shape to snugly grasp the hooked end of a fly in a clamp-like manner.

An additional object of my invention is to provide such a knot tying device, wherein the hook-receiving support means includes provision for receiving a number of different hook sizes, with the eye portion thereof being maintained in a work area to be illuminated by the illumination means.

These as well as other objects of my invention will readily become apparent upon a consideration of the following description and drawings in which:

FIG. 1 is an exploded perspective view in accordance with one form of my invention and showing the manner in which a fly may be inserted in the knot tying device and the appropriate knot tied.

FIGS. 2 and 3 are plan and side views respectively of the knot tying device constructed in accordance with the embodiment of FIG. 1.

FIGURES 4 and 5 are plan and side elevational views respectively, in accordance with another form of my invention.

Referring now to the drawings and initially to the form of the invention illustrated in FIGS. 1–3, the knot tying device 10 includes an elongated member 12 constructed of an appropriate material having the characteristic of longitudinally transmitting a concentrated light between its opposed ends 14 and 16, such as the above noted "Lucite" or "Plexiglas." Adjacent end 16 there is provided a support means, generally shown as 15, to receive the hooked end 22 of dry fly 20, which is to be knotted to the leader 30. It should be initially noted at this point that the term "leader" is used herein for convenience of description, but it should be understood that the improvements of the present invention are not limited to the use of any particular kind of cord, line, thread, filament, nylon, etc., and that the term "leader" as used herein is intended to include and embrace any and all of the above media.

The hook-receiving support means of this embodiment is provided by a longitudinal slit 18 within which the hook 22 of the fly is inserted and a transverse slit 19 against which the bended portion of the hook abuts. Longitudinal slit 18 forms a bifurcated end, including portions 32, 34 which provide a clamp means urged apart by the insertion of hook-shaped pointed end 22 of the fly, to separate and resiliently return to securably engage the hook 22 in a clamp-like manner, and maintain it in its proper position, such that the eye portion 35 thereof is located in a work area, to be illuminated, in a manner henceforth to be described.

A source of illumination is provided by a conventional type of commercially available flashlight 40, of the size generally referred to as a penlight. Penlight 40 is encased within housing 42 and includes an externally operable switch member 44. The source of energy is provided by battery cell 46 which may be inserted through rear cap 48, and includes a positive terminal 50 which is connected to base 52, of a lamp means 54. Such penlights generally include a threaded collar 56 for receiving the light bulb 54. In accordance with one form of my invention, end 14 of the elongated member 12 includes an internally threaded opening 58 of a suitable pitch to threadedly receive the externally threaded portion of collar member 56. A forward cutout is also provided at 60 to receive the end of the bulb member 54 as best shown in FIG. 2. In accordance with the properties of the material forming elongated member 12, the source of illumination introduced by bulb 54 at end 14 will be transmitted through the elongated member 12 to its opposite end 16. A light directing means is provided at end 16, as by scarified or roughened surface 60, to direct the transmitted beam of light to the region containing the eye 35. Also, the slit 18 will be illuminated by the beams of light transmitted through member 12.

It should also be noted that a portion of elongated member 12 communicating with end 16 is preferably tapered towards that end so as to facilitate the operation of the device, with the angular orientation of transverse slit 19 being appropriately dimensioned to receive different hook sizes, as shown dotted by member 22' of FIG. 3, with the eye 35' thereof located in the illuminated work area.

The operation of the knot tying device is as follows: Swith 44 of penlight assembly 40 is activated such that the beam of light originating at bulb 44 is transmitted through the length of elongated member 12 and is directed by scarified surface 60 to provide an illuminated work area at end 16, as shown by the light rays 55 of FIG. 2, and along slit 18. The hook end 22 of fly 20 is then wedged into transverse slit 18 and pulled forward towards end 16, so the eye 35 is in light. Thus, the fly 20 will now be seated in the knot tying device, permitting the threading of leader 30 through eye 35, without the inadvertent damaging of the hackles. To tie the knot shown in FIG. 1, the knot tying device 10 is then twisted about five times with the leader being held stationary. The leader end is passed back through loop 31 and the leader pulled tight urging the bend of the hook against transverse slit 19, with the knotting being thus finished. In this very simple and rapid fashion, the knotted fly 20 is then removed from the device and switch 44 moved to an inoperative position to conserve battery life. In this regard it should be realized that inasmuch as the source of illumination need only be actuated during the short periods of time required to do the threading of the fly, battery life is substantially lengthened.

Reference is now made to FIGS. 4 and 5, which show a form of my invention having a somewhat modified elongated member 112. Elongated member 112 similarly includes a hook-receiving support means at one end 116 thereof and a source of illumination at the opposed end 114 thereof. The source of illumination at end 114 may be secured as shown in FIG. 1 or 3, or alternatively may be mounted by snugly fitting the region about an end 114 into tubular member 115, into which penlight 140 is inserted. It should naturally be recognized the flashlight carrying arrangement of tube 115 may alternatively be used in conjunction with the elongated member as shown in FIGS. 1–3 above.

The hook support means of FIGS. 4 and 5 includes an elongated slit 118 which extends from a clearance aperture 117 all the way to end 116, to provide bifurcated ends 132, 134. The transverse stop previously provided by slit 19 of the FIGS. 1–3 embodiment is now provided by a pin member 119, secured as by an appropriate cement to a groove 133 in one of the bifurcated end pieces 132, and is freely movable in a complementary groove 135 of the other end piece 134, such that the pin is freely floating. Thus, it should be appreciated as the hooked end 22 of the fly is inserted into clearance opening 117 and moved forward along longitudinal slit 118, the bifurcated ends 132, 134 will be free to move apart, such that when the curvature of the hook abuts against stop member 119, it will be fixedly and securably engaged by the side walls of transverse slit 118. If desired, an additional pin means 119' may be provided to accommodate a larger hook size. The ends 160, 160' are scarified so as to suitably direct the received light beam into the work area, whereat the eye 35 of the fly will be positioned.

It is therefore seen that my invention provides an extremely simplified fisherman's knot tying apparatus, which includes the integral assembly of a hook support, self-contained illumination source, light transmitting means and light directing means, to facilitate the threading and knotting of hook eyes during conditions of limited or virtually no natural illumination.

In the foregoing, the instant invention has been described in conjunction with preferred embodiments. Since many variations will now become obvious to those skilled in the art, it is accordingly desired that the breadth of the claims not be limited to the specific disclosure herein contained.

The embodiments of the invention in which an inclusive privilege or property is claimed are defined as follows:

1. A tying device for facilitating the knotting of a leader strand in the eye of a fish hook, comprising:
   an elongated member of a convenient size to be hand-grasped by a user;
   said elongated member including a first and second end;
   support means at said first end including clamp means adapted to removably receive and securably engage the hook-shaped end of a fish hook inserted therein in a clamp-like manner, with the eye of the hook positioned at a predetermined region adjacent said clamp means;
   light source means carried by said second end;
   said elongated member constructed of a material having the characteristic of longitudinally transmitting a concentrated beam of light between said first and second ends, such that the light originated at said light source means is conducted through said elongated member towards said second end;

light directing means at said second end for directing the light conducted therethrough towards said predetermined region, whereby an illuminated work area is provided at said region for knotting the eye.

2. A tying device as set forth in claim 1:

said elongated member formed of a polymerized derivative of an acrylic resin.

3. A tying device as set forth in claim 2:

said light directing means being a scarified surface at said second end, positioned to receive the rays of the concentrated light beam directed through said elongated member and direct the rays into said work area.

4. A tying device as set forth in claim 1:

said support means including a longitudinal slit at said second end to provide a bifurcated end adapted to separate and resiliently return to securably engage the hook-shaped end of a fish hook, such that different size hooks may be accommodated:

and a transverse stop means across the end region of said slit closest to said second end, to limit the longitudinal movement of the fish hook towards said second end.

5. A tying device as set forth in claim 4:

said transverse stop means being a transverse slit extending from the longitudinal slit end closest to said second end, but displaced from said second end, to a sidewall of said elongated member.

6. A tying device as set forth in claim 4:

said longitudinal slit extending completely to said second end, said transverse stop means being a pin means secured to one side of the bifurcated end and freely movable in the other end, at a location displaced from said second end, and extending across said slit.

7. A tying device as set forth in claim 4:

said slit and stop means including cooperating surfaces to receive different size hooks, such that the eyes thereof are located in said illuminated work area.

8. A tying device as set forth in claim 4:

said elongated member formed of a polymerized derivative of an acrylic resin.

9. A tying device as set forth in claim 4:

said light source means illuminating said slit and the location of the hook eye.

10. A knot tying device as set forth in claim 4:

said stop means being a pin;

and means mounting said pin within said bifurcated ends in a freely floating manner.

References Cited

UNITED STATES PATENTS

| | | | |
|---|---|---|---|
| 2,525,414 | 10/1950 | Kleinschmidt | 240—6.46 |
| 3,045,111 | 7/1962 | Hoenig | 240—6.46 |
| 3,106,417 | 10/1963 | Clow | 289—17 |
| 3,131,957 | 5/1964 | Musto | 289—17 |
| 3,252,724 | 5/1966 | Kearns | 289—17 |
| 2,804,710 | 9/1957 | Stilwell | 43—1 X |

LOUIS K. RIMRODT, *Primary Examiner.*